United States Patent
Wears et al.

(10) Patent No.: US 7,028,712 B2
(45) Date of Patent: Apr. 18, 2006

(54) SKIRT GUIDED GLOBE VALVE

(75) Inventors: William Everett Wears, Marshalltown, IA (US); David George Halm, Haverhill, IA (US)

(73) Assignee: Fisher Controls International LLC., St. Louis, MO (US)

( * ) Notice: Subject to any disclaimer, the term of this patent is extended or adjusted under 35 U.S.C. 154(b) by 151 days.

(21) Appl. No.: 10/197,068

(22) Filed: Jul. 17, 2002

(65) Prior Publication Data

US 2004/0011412 A1    Jan. 22, 2004

(51) Int. Cl.
    *F16K 3/22*    (2006.01)
(52) U.S. Cl. ............... 137/625.33; 137/625.38
(58) Field of Classification Search ............ 137/625.3, 137/625.33, 625.37, 625.38, 625.39
    See application file for complete search history.

(56) References Cited

U.S. PATENT DOCUMENTS

| | | | |
|---|---|---|---|
| 413,900 A | 10/1889 | Blanchard | |
| 517,575 A | 4/1894 | Knapp et al. | |
| 952,187 A | 3/1910 | Donnelly | |
| 963,836 A | 7/1910 | Varlie | |
| 991,550 A * | 5/1911 | Serrell | 137/625.38 |
| 1,297,229 A | 3/1919 | Ostrander | |
| 1,384,432 A | 7/1921 | Dempler | |
| 1,830,407 A | 11/1931 | Prenveille | |
| 2,541,176 A * | 2/1951 | Rockwell | 137/625.3 |
| 2,626,629 A | 1/1953 | Mueller et al. | 137/283 |
| 2,642,254 A * | 6/1953 | Armstrong | 137/625.3 |
| 2,672,883 A | 3/1954 | Dillman | 137/588 |
| 2,706,489 A | 4/1955 | Pedersen | 137/488 |
| 3,602,261 A | 8/1971 | Brown et al. | 137/625.3 |
| 3,606,911 A | 9/1971 | Keith | 137/269 |
| 3,776,278 A * | 12/1973 | Allen | 137/625.38 |
| 3,791,413 A * | 2/1974 | Muller et al. | 137/625.3 |
| 3,821,968 A * | 7/1974 | Barb | 137/625.3 |
| 3,857,542 A | 12/1974 | Heymann | 251/120 |
| 3,870,077 A | 3/1975 | Nakamura | 137/614.11 |
| 3,990,475 A | 11/1976 | Myers | 137/625.3 |
| 4,040,440 A | 8/1977 | Zaki | 137/375 |
| 4,125,129 A | 11/1978 | Baumann | 137/625.3 |
| 4,261,389 A * | 4/1981 | Hager et al. | 137/625.38 |
| 4,276,906 A | 7/1981 | Eguchi | 137/625.38 |
| 4,356,996 A | 11/1982 | Linder et al. | 251/82 |
| 4,375,821 A | 3/1983 | Nanao | 137/239 |
| 4,384,592 A | 5/1983 | Ng | 137/625.37 |
| 4,693,450 A | 9/1987 | Paetzel | 251/121 |

(Continued)

FOREIGN PATENT DOCUMENTS

DE    2 046 574    3/1972

OTHER PUBLICATIONS

White, Frank M. Fluid Mechanics. McGraw-Hill, Inc., 1979. p. 356.*

(Continued)

*Primary Examiner*—John Fox
(74) *Attorney, Agent, or Firm*—Marshall, Gerstein & Borun LLP

(57) ABSTRACT

A skirt guided control valve provides streamlined flow and minimum resistance to flow in flow up and flow down conditions when the valve is open. The skirt guided control valve has a fluid inlet, a fluid outlet, a passageway disposed between the fluid inlet and fluid outlet, a valve seat and a valve plug with a skirt. The valve seat and the skirt portion of the valve plug include blended edges and contoured surfaces to provide for streamlined flow.

10 Claims, 4 Drawing Sheets

U.S. PATENT DOCUMENTS

| | | | |
|---|---|---|---|
| 4,702,279 A | 10/1987 | Giese | 137/625.17 |
| 5,005,605 A | 4/1991 | Kueffer et al. | 137/625.39 |
| 5,012,841 A | 5/1991 | Kueffer | 137/625.39 |
| 5,381,818 A * | 1/1995 | Nendzig et al. | 137/625.33 |
| 5,931,445 A | 8/1999 | Dvorak et al. | 251/118 |
| 6,003,551 A * | 12/1999 | Wears | 137/625.33 |
| 6,082,405 A * | 7/2000 | Qvarfordh et al. | 137/625.37 |
| 6,701,958 B1 * | 3/2004 | Baumann | 137/625.3 |

OTHER PUBLICATIONS

Samson Brochure showing Samson 241 valve installed.

* cited by examiner

SKIRT GUIDED GLOBE VALVE

TECHNICAL FIELD

This invention relates generally to control valves and more particularly to a skirt guided globe valve having an increased flow capacity.

BACKGROUND

Plants and factories utilize process control devices to control the flow of fluids in processes, wherein "fluids" include liquids, gasses, or any mixture that can flow through a pipe. Manufacturing processes that create consumer articles or goods such as fuel, food, and clothes require control valves to control and regulate fluid flow. Even a medium sized factory may utilize hundreds of control valves to control a process. Control valves have been utilized for over a century, during which time valve designers have continuously improved the operational performance of control valves.

When designing a process, the designer is faced with many design requirements and design constraints. While a valve must be able to provide the required flow capacity when the valve is in the full open position, minimizing the body size of a valve for a particular application provides many benefits. Minimizing the valve size reduces the cost of the valve itself and reduces the cost of the actuator that controls the valve. More importantly, a valve with a smaller body provides improved performance and stability because a smaller valve has less gain, more accuracy and better flexibility than a larger valve. In addition to creating process instabilities and other control system uncertainties, oversized valves require more frequent plug movement to accurately control flowing fluids, causing increased wear on the valve components and the valve actuator. Oversized valves also increase process variability. Process variability is very serious because it results in an inefficiency which is an expense that continues twenty-four hours a day, seven days a week (or whenever the process is running). Thus, a lower cost, smaller valve can provide superior performance if it can meet the maximum flow requirements.

Some process control applications require a valve to maximize flow in two directions, often called a "bi-directional flow application." In a typical bi-directional valve, there is a vertical segment where fluid flows upward. Therefore, flow in one direction is often referred to as flow-up and flow in the other direction is referred to as flow-down. In a majority of applications, valve selection is predicated on the direction of flow through the valve. Skirted globe valves are popular for bi-directional flow applications because they can be utilized regardless of flow direction. A skirted plug is supported by the skirt as the plug slides up and down, guided by an annular valve seat in the valve body irrespective of flow direction. In some cases the annular valve seat serves a dual role as a bearing surface for the plug skirt and as a sealing surface for mating with the sealing surface on the plug. In particular, the skirt acts as a guide to stabilize the valve plug within the valve as fluidic forces place a side load on the plug. The skirted plug allows the valve stem to be reduced in size because the valve plug is supported from both ends (i.e. the stem and the skirt).

A smaller valve stem provides multiple benefits including minimization of the force required to move the plug because there is less friction on the stem from the valve stem packing and seal. Smaller valve stems are also easier to seal because there is less force on the seal due to reduced surface area. Minimizing the size of the valve stem also minimizes the size of the actuator required to move the valve plug due to reduced operating friction. Reduced friction also provides improved plug reaction time and better overall valve performance.

One inherent problem with utilizing a skirted globe valve is that the valve plug is never fully removed from the valve seat. As a result, skirt material obstructs the flow path and reduces the amount of flow in a full open condition. In addition to decreasing maximum capacity by decreasing the diameter of the flow path, the skirt obstruction produces vortices, turbulence and pressure gradients in the flowing fluid which results in hydrodynamic drag. Thus, the obstruction presented by the skirt prevents the valve from producing the maximum flow properties found in other valve types having the same port size.

SUMMARY

A skirt guided control valve is disclosed which has a greater flow capacity while maintaining more optimum control characteristics associated with a smaller body size. The disclosed skirted control valve provides streamlined flow and minimum resistance to flow in flow up and flow down conditions when the valve is fully open. The skirted valve has blended edges and contoured surfaces in the flow path. More particularly, the valve has blended edges and contoured surfaces on the skirted valve plug and the valve seat.

In one embodiment, the skirt guided valve has a valve plug with a skirt, a fluid inlet, a fluid outlet and a passageway disposed between the fluid inlet and fluid outlet. The skirted plug may include a cap having first and second sides, the first side having a perimeter and a curved surface at the perimeter while the second side of the cap is attached to a tubular member that forms a skirt having an inner surface and an outer surface. The outer surface on the skirt provides a bearing surface for sliding engagement with the valve seat. Perforations in the wall of the tubular member form passages to facilitate fluid flow through the wall when the skirted valve plug is in the open position. A window surface, disposed between the inner surface and the outer surface, has a blended edge at a junction with the inner surface and the outer surface of the tubular member. In another embodiment, a protrusion is mounted inside the tubular member to streamline flow proximate to the plug. The blended surfaces and contours and the protrusion promote laminar flow and reduce eddies and pressure gradients within the valve body to minimize hydrodynamic drag and maximize flow volume.

DETAILED DESCRIPTION

Skirt guided globe valves have been utilized for decades in the process control industry. Although skirt guided valves have many advantages, they also have significant drawbacks. One such drawback is reduced flow capacity compared to other types of valves because, in skirt guided valves, a portion of the plug is never fully retracted away from the valve seat. The bi-directional skirt guided globe valve disclosed herein has increased flow capacity as a result of the blending of edges and contouring of surfaces within the valve to achieve streamlined, laminar flow while maintaining the efficiencies and reliability typically associated with skirt guided valves.

Figure 1:
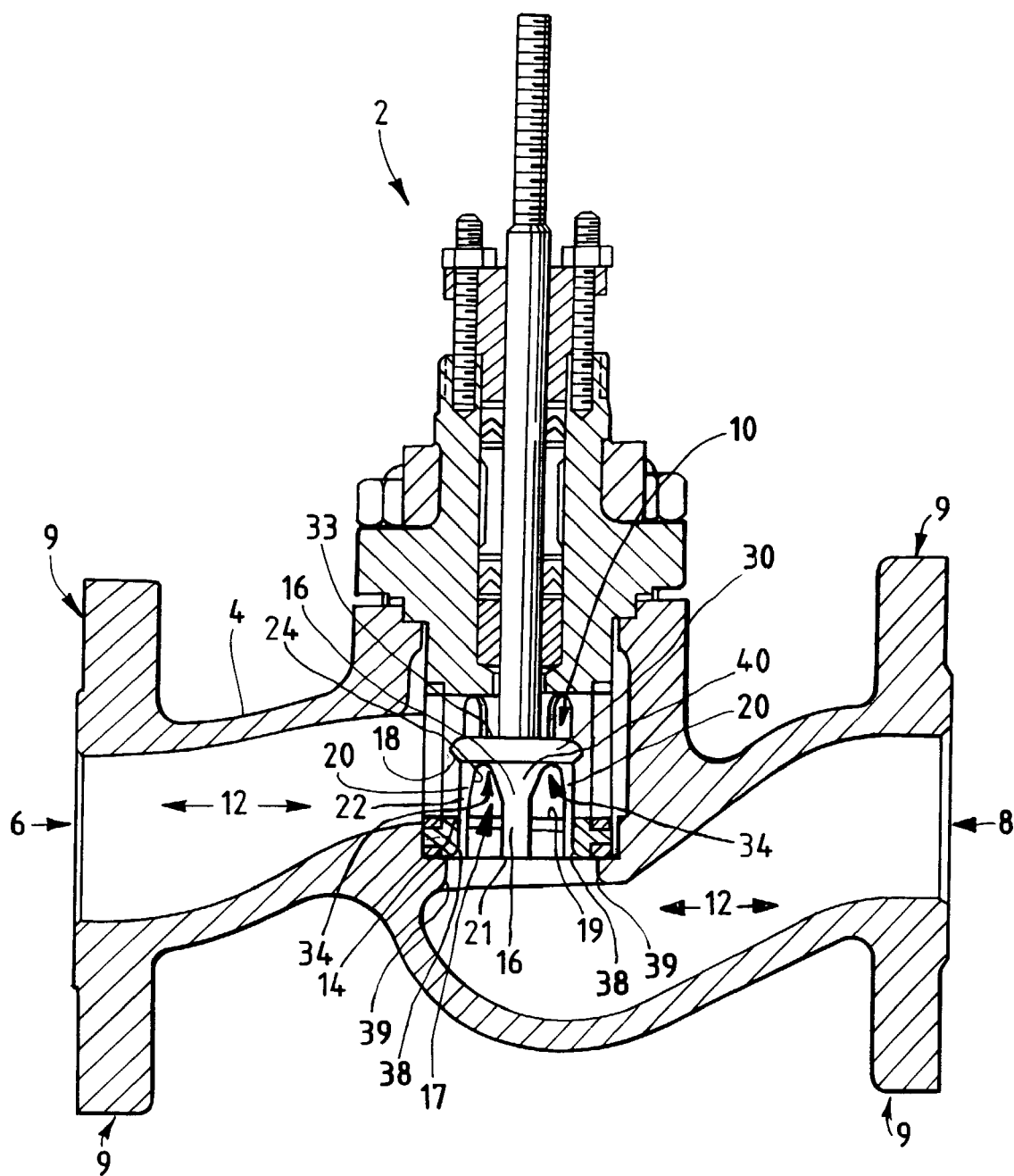
FIG. 1 illustrates a skirt guided globe valve.
Figure 2:
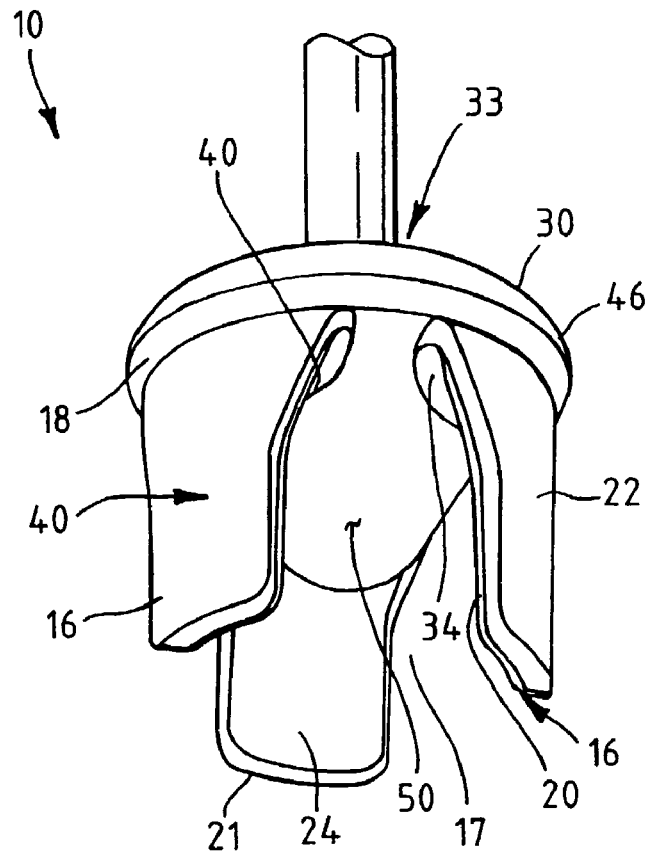
FIG. 2 is a perspective view of a skirted valve plug from the globe valve of FIG. 1.

FIG. 1, illustrates a skirt guided globe valve 2 having a valve body 4, an outlet 6, an inlet 8 (when used in the flow-up configuration) and a skirted valve plug 10 (illustrated in more detail in FIG. 2). The outlet 6 and the inlet 8 typically have a mounting mechanism such as a flange 9 for mounting the globe valve 2 into a process system. The outlet 6 and the inlet 8 are connected by a passageway 12 and the skirted valve plug 10 is movably mounted within the passageway 12 to control the flow of fluid through the passageway 12. An annular valve seat or seat ring 14 provides a guiding and sealing surface for engagement with the skirted valve plug 10. The annular valve seat or seat ring 14 has a sealing surface on a first side 19 which mates with a plug sealing surface 18 when the skirted valve plug 10 is in a closed position (not shown).

A blended edge 38 can be placed at the surface where the seat ring 14 terminates or meets the bore for the seat ring 14, e.g., at the bottom edge of the seat ring 14. Further, a blended edge 39 may be placed at the junction of the bore for the seat ring 14 and the fluid passageway 12, e.g. in the inlet passageway 6. The blended edges 38 and 39 provide streamlined flow and increases the maximum flow capacity of the globe valve 2. The valve seat or seat ring 14 may be retained in the valve body 4 in any known or desired manner and valve seat retention methods and will not be described herein.

The skirted valve plug 10 includes a cap 30 and a tubular member 40. The cap 30 has a first surface 33 (illustrated in FIG. 1 as a top surface) and a second surface 34 (illustrated in FIG. 1 as a bottom surface). The tubular member 40 which forms the skirt portion of the skirted valve plug 10 is attached to the second surface 34 of the cap 30. Although the tubular member 40 is illustrated as being cylindrical in shape, it may have substantial material removed from it forming large perforations 17 therein. In the embodiment of FIG. 2, the skirted valve plug 10 appears more like a "miniature circular coffee table" wherein the cap 30 is the tabletop and skirts 16 are the legs of the table.

Figure 5:
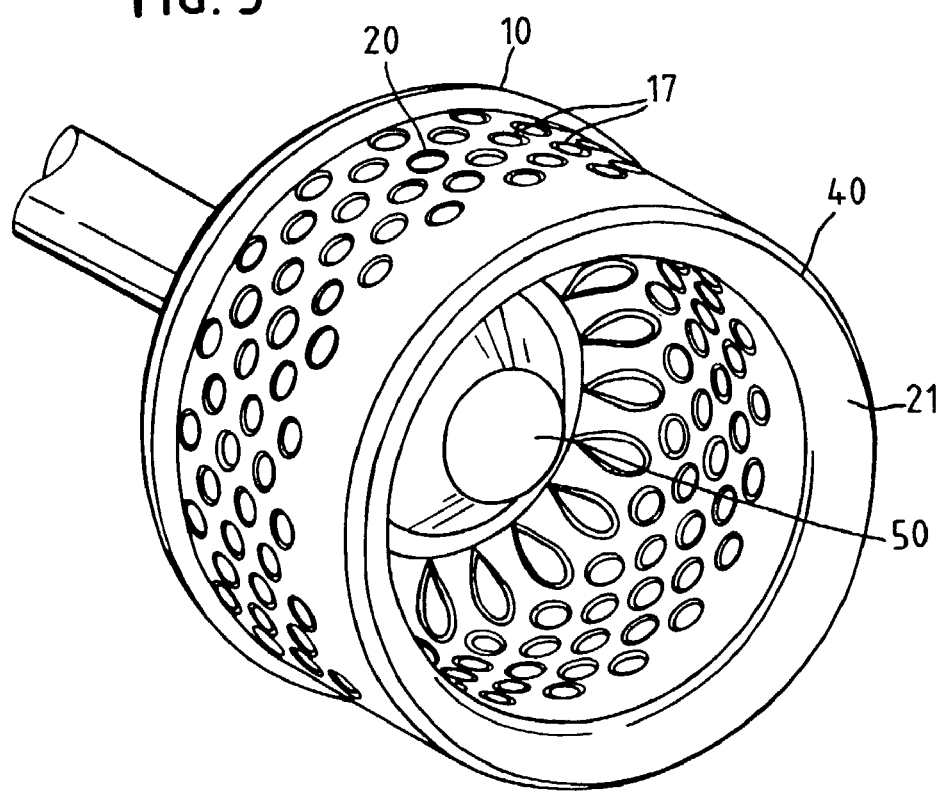
FIG. 5 illustrates a skirted valve plug having relatively small perforations in the skirt of the valve plug.
Figure 6:
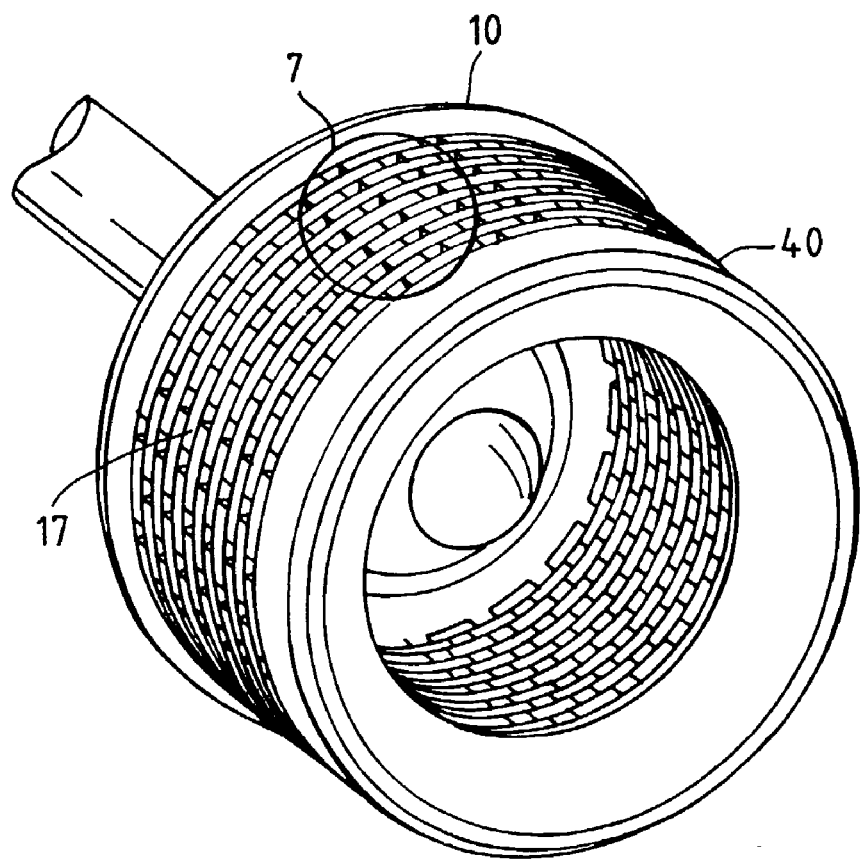
FIG. 6 depicts a skirted valve plug made using a stacked disk construction.
Figure 7:
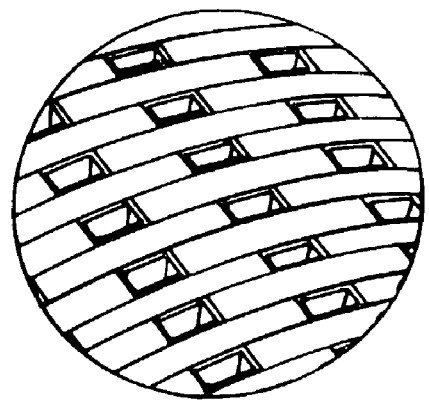
FIG. 7 depicts an expanded view of a portion of the valve plug of FIG. 6.

The tubular member 40 may be any other tubular member, such as a tube with numerous small perforations 17 as illustrated in FIG. 5 or as diffusion type perforations 17 as illustrated in FIGS. 6 and 7. The skirted plugs illustrated herein are guided in the valve 2 by the annular valve seat 14.

Referring back to FIG. 1, the wall of the tubular member 40 has an inside or inner wall surface 24 and an outside or outer wall surface 22, which bears on the annular valve seat 14. In operation, fluid flows through the perforations 17 when the valve plug 10 is in an open position. Window surfaces 20 are formed between the outside wall surface 22 and the inside wall surface 24. Typically, although not necessarily, at least a portion of the fluid flowing through the perforation 17 is flowing in a direction generally parallel to a window surface 20.

Under dynamic flow conditions, the skirted valve plug 10 may move radially within annular valve seat 14 and the skirts 16 may contact the annular seat 14. The annular seat 14 provides support for the skirted valve plug 10 when high velocity fluids flowing through the perforations 17 place torque on the valve plug 10. It has been found that placing blends on the edges, especially the inside edges of the skirts 16 will reduce the amount of torque on the valve plug 10. In a typical application, the bearing surface of the tubular member 40 has an outside diameter which is between 2 to 6 thousandths of an inch smaller than the inside diameter of annular valve seat 14. In some cases, valves that have a port size of over 4 inches in diameter or that are subjected to temperatures over a few hundred degrees may require different tolerances. This clearance minimizes operating friction and still provides adequate radial support for the skirted plug 10. The skirt guided globe valve 12 can have a balanced trim (which equalizes the pressure on each side of the valve plug such that a reduced force is required for plug closure) or an unbalanced trim.

FIG. 2 illustrates an enlarged perspective view of a skirted valve plug 10. Like components in FIGS. 1 and 2 have like numbers. A basic physics phenomena called Bernoulli's principle states that when flowing fluids encounter a reduced cross-sectional area, the velocity of the flowing fluid increases. The window surface 20 of the plug 10 is the typical location where a flowing fluid has its maximum velocity. If a fluid has to traverse a rough surface or turn a sharp corner at high velocity, then the fluid layers will separate, creating turbulence, eddies and pressure gradients resulting in hydrodynamic drag. To reduce drag and increase capacity in a globe valve 2, the rate of change of the cross sectional area encountered by the flowing fluid is minimized by streamlining the surfaces of the valve plug, particularly where maximum velocity is present. By reducing the rate of change of cross sectional area, hydrodynamic drag is decreased.

The window surfaces 20 present between the inside surface 24 and the outside surface 22 of the tubular member 40 or the skirts 16 are blended into the inner surface 24 and the outer surface 22 to provide for laminar flow proximate to the window surfaces 20 which, in turn, reduces torque on the skirts 16. In flow-up conditions, flowing fluids initially encounter the bottom surface 21 of skirts 16. The bottom surface 21 can also be blended to optimize flow and make the bottom of the plug 10 more hydrodynamic. The perimeter (silhouette) of the perforations 17 can be contoured such that there are no abrupt changes or "corners" in the perimeter of the perforation 17. Specifically, the perimeter of the perforations 17 has "contoured corners" instead of measurable angles.

Cap 30 has a top surface 33 defined by a perimeter 46. A contoured surface can be placed on the perimeter 46 of the cap 30. The contour can be in the form of a radius, a chamfer or any variation thereof which provides a streamline flow over the perimeter 46 of the cap 30. It is desirable that fluid flowing over the cap 30 is not required to radically change direction when it flows over the cap 30, such as would be required if the perimeter 46 had a sharp edge, for example, a right angle. It has been discovered that a cap perimeter 46 contour decreases hydrodynamic drag in both flow up and flow-down conditions.

In one embodiment the cap 30 has a protrusion 50 within the tubular member 40 to streamline fluid flow inside the tubular member 40. The protrusion 50 may be mounted substantially concentric to the tubular member 40 or it may be mounted in a non-conventional manner for various applications. The contoured surface of the protrusion 50 allows for laminar flow proximate to the plug 10, which reduces eddies, flow separation and drastic pressure gradients within the tubular member 40 and the valve body 2. The protrusion 50 can be mounted to the cap 30 or it can be mounted to the tubular member 40 using, for example, vanes or radial members extending from the protrusion 50 to the tubular member 40 (not shown).

Figure 3:
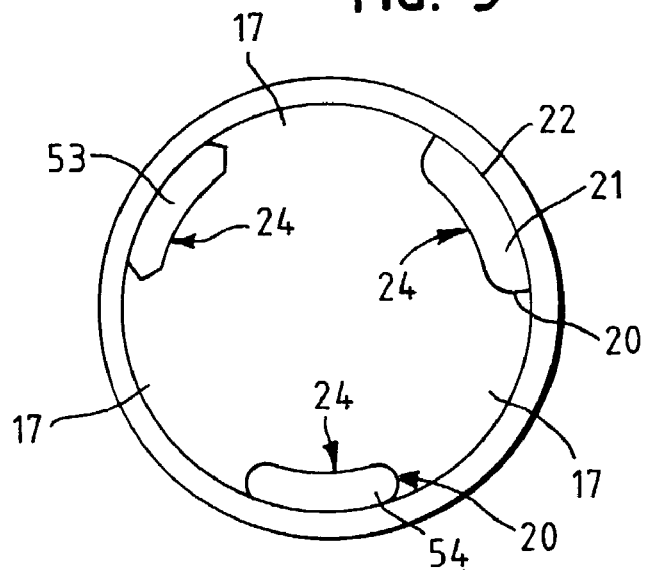
FIG. 3 is a bottom view of the skirted valve plug of FIG. 2, illustrating various blending configurations for skirt edges.

In FIG. 3, a bottom view of the skirted valve plug 10 of FIG. 2 illustrates different types of blends that may be implemented on the tubular member 40. Like components in FIGS. 1 and 3 have like numbers. Although only three different types of blends are illustrated, others may be used and these configurations should not be considered limiting to the scope of the invention. A first skirt 21 has a radius blend on the interface between the inside wall 24 and the window surface 20. Both edges of a second skirt 53 are chamfered at approximately a sixty (60) degree angle and the apex (where the chamfers meet) is blended or radiused. A third skirt 54 has blended edges on the interface between the inner surface 24 and the window surface 20 and on the interface between the outer surface 22 and the window surface 20. It is preferred to manufacture a blend on the intersection of surfaces, which blend is large in relation to the thickness of the wall of the tubular member 40. A blend having a radius that is greater than ten (10) percent of the skirt wall thickness has been determined to favorably increase flow capacity of a skirted globe valve. The blending may also be accomplished by placing a bevel, chamfer or an irregular arc or radius on the edge (not shown) such that the number of "sharp" angles in the flow path are minimized or avoided. The plug 10 has a blend which is greater than that achieved by a standard de-burring procedures as the radius created when de-burring is typically less than one-tenth ($1/10$) the thickness of the wall material.

Any combination of blend configurations can be incorporated on the plug 10. For example, the blending on the interface between the window surface 20 and the outside wall surface 22 can be different than the blend between the window surface 20 and the inside wall surface 24. Further, the radius of a blend may vary from surface to surface and may even be elliptical in nature.

Figure 4:
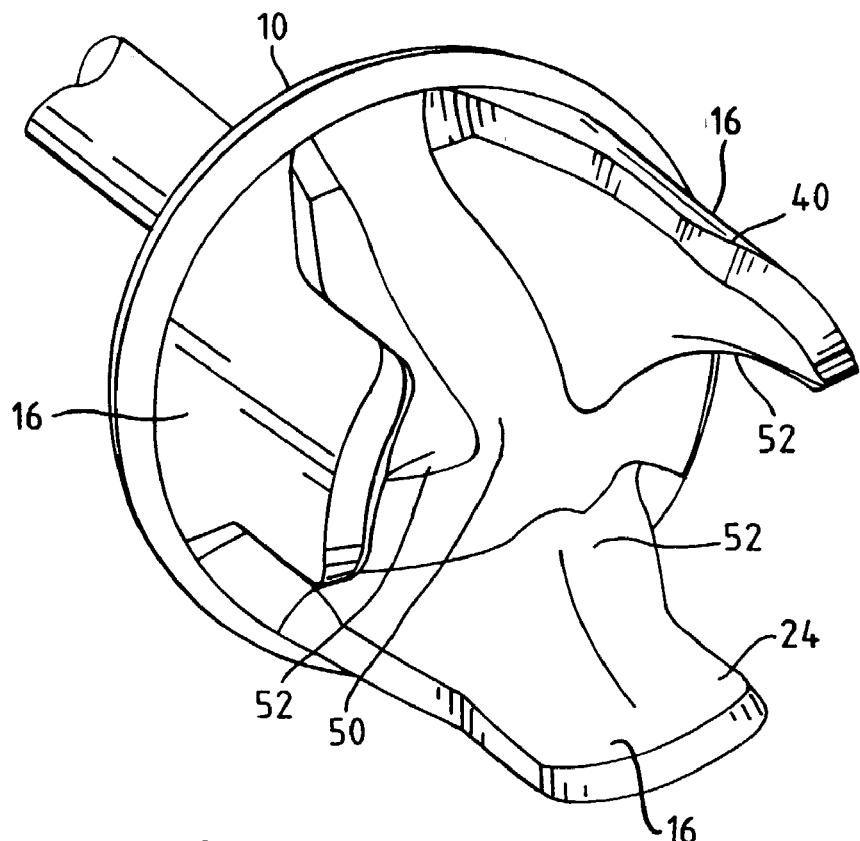
FIG. 4 depicts a skirted valve plug having contoured webs interconnecting various parts of the valve plug.

Referring to FIG. 4, web members 52 can be placed between the inner surface 24 of the skirts and the protrusion 50. Like components in FIGS. 1 and 4 have like numbers. The web members 52 can be planar (not shown) or they can be contoured as depicted. The web members 52 provide many useful features such as stiffening the skirts and streamlining the flow proximate to the plug 10. It is beneficial that the skirts 16 are rigid during machining processes and during turbulent fluid flow conditions. Contoured web members 52 reduce hydrodynamic drag because substantially all surfaces or areas within the tubular member 40 of the plug are in the direct flow path of the flowing fluids. This hydrodynamic design leaves minimal pockets or areas where flowing fluids can pool, circulate, stagnate, and create hydrodynamic drag.

The skirted plug 10 illustrated in FIG. 5 can be implemented in applications where maximum flow and maximum noise reduction are desired. Like components in FIGS. 1 and 5 have like numbers. Depending on the desired noise attenuation and the desired capacity of the valve, the total area of the perforations 17 in the tubular member 40 can be increased or decreased. The quantity, size and shape of the perforations 17 in the skirted plug 10 affect the noise (volume and pitch) which a valve will emit under a load. The blending and contouring of the window surfaces 20 enhance the hydrodynamic properties of the skirted plug 10. Additionally, the bottom of the tubular member 40 or the bottom of the skirt 21 is blended, and a protrusion 50 is added to the plug 10 to increase the hydrodynamic properties of the low noise plug 10.

Referring to FIGS. 6 and 7, another low noise, hydrodynamic plug 10, is illustrated. Like components in FIGS. 1 and 6 have like numbers. Tubular member 40 may be configured similar to a stacked disk design as described in U.S. Pat. No. 6,244,297 assigned to Fisher Controls International, Inc. which is hereby expressly incorporated by reference herein. Irrespective of the cross sectional area of the perforations 17 in the tubular member 40 of skirted plug 10, maximum fluid flow for the total perforated area can be achieved utilizing blending, contouring and streamlining as best illustrated in FIG. 7.

The foregoing is a detailed description of preferred embodiments of the invention. Various modifications and additions can be made without departing from the spirit and scope of the invention. Accordingly, this description is meant to be taken only by way of example and not to otherwise limit the scope of the invention.

The invention claimed is:

1. A skirt guided fluid control valve comprising:
   a valve body having a fluid passageway disposed between a fluid inlet and a fluid outlet;
   an annular valve seat having a throughbore and being disposed within the fluid passageway;
   a valve stem moveably mounted within the valve body; and,
   a valve plug connected to the valve stem and moveable between an open position and a closed position, the valve plug comprising:
   a cap having first and second sides, the first side connected to the valve stem and the second side adapted to seat against the annular valve seat when the valve plug is in the closed position;
   a tubular member concentrically coupled to the cap at the second side and arranged to circumferentially engage the throughbore of the annular valve seat to guide the valve between the open and closed position, the tubular member having a wall with an inner surface and an outer surface and at least one perforation to permit fluid flow through the wall wherein the at least one perforation has a window surface between the inner surface and the outer surface, and a blended edge where the window surface meets the outer surface; and,
   a conical protrusion mounted proximate to the second side of the cap, the protrusion being shorter than the tubular member and promoting laminar fluid flow proximate to the valve plug to substantially reduce hydrodynamic drag.

2. The fluid control valve of claim 1, wherein the protrusion protrudes into the tubular member.

3. The fluid control valve of claim 1, wherein the protrusion has a maximum diameter which is smaller than a diameter of the inner surface of the tubular member.

4. The fluid control valve of claim 1, wherein the protrusion is mounted concentrically to the tubular member.

5. The fluid control valve of claim 1, wherein a bottom surface of the plug is blended.

6. The fluid control valve of claim 1, further including a bore disposed between the fluid inlet and the fluid outlet, the bore adapted to accept the annular valve seat and having a blended edge between the fluid inlet and the annular valve seat.

7. A fluid control valve comprising:
a valve body having a fluid passageway disposed between a fluid inlet and a fluid outlet;
an annular valve seat within the fluid passageway;
a valve stem moveably mounted in the valve body;
a valve plug connected to the valve stem and disposed in the fluid passageway, the valve plug moveable between an open position and a closed position, and including;
a cap having first and second sides, the first side having a first perimeter and a curved surface at the first perimeter and the second side adapted to seat against the annular valve seat when the valve plug is in the closed position; and,
a tubular member connected to the second side of the cap, the tubular member having an inner surface, an outer surface that provides a bearing surface for sliding engagement with the annular valve seat, and at least one perforation defined by a window surface disposed between the inner surface and the outer surface, the at least one perforation allowing passage of fluid between the inner surface and the outer surface when the valve plug is in the open position, the window surface having a blended edge at a junction with the inner surface wherein the tubular member has a thickness and the blended edge has a curvature defined by a radius that is greater than one tenth of the thickness of the wall of the tubular member.

8. A fluid control valve comprising:
a valve body having a fluid passageway disposed between a fluid inlet and a fluid outlet;
an annular valve seat within the fluid passageway;
a valve stem moveably mounted in the valve body;
a valve plug connected to the valve stem and disposed in the fluid passageway, the valve plug moveable between an open position and a closed position, and including;
a cap having first and second sides, the first side having a first perimeter and a curved surface at the first perimeter and the second side adapted to seat against the annular valve seat when the valve plug is in the closed position; and,
a tubular member connected to the second side of the cap, the tubular member having an inner surface, an outer surface that provides a bearing surface for sliding engagement with the annular valve seat, at least one perforation defined by a window surface disposed between the inner surface and the outer surface and having a blended edge at a junction with the inner surface, a protrusion inside the tubular member including at least one web member which connects the tubular member to the protrusion wherein the at least one perforation provides fluid flow between the inner surface and the outer surface when the valve plug is in the open position.

9. The fluid control valve of claim 8, wherein the at least one web member is a contoured surface.

10. A fluid control valve comprising:
a valve body having a fluid passageway disposed between a fluid inlet and a fluid outlet;
an annular valve seat within the fluid passageway;
a valve stem moveably mounted in the valve body;
a valve plug connected to the valve stem and disposed in the fluid passageway, the valve plug moveable between an open position and a closed position, and including;
a cap having first and second sides, the first side having a first perimeter and a curved surface at the first perimeter and the second side adapted to seat against the annular valve seat when the valve plug is in the closed position; and,
a tubular member connected to the second side of the cap, the tubular member having an inner surface, an outer surface that provides a bearing surface for sliding engagement with the annular valve seat, a third surface arranged furthest from the cap having a blend where the third surface interfaces the inner surface of the tubular member and at least one perforation defined by a window surface disposed between the inner surface and the outer surface, the at least one perforation allowing passage of fluid between the inner surface and the outer surface when the valve plug is in the open position, the window surface having a blended edge at a junction with the inner surface.

* * * * *

UNITED STATES PATENT AND TRADEMARK OFFICE
CERTIFICATE OF CORRECTION

PATENT NO. : 7,028,712 B2  Page 1 of 1
APPLICATION NO. : 10/197068
DATED : April 18, 2006
INVENTOR(S) : William E. Wears et al.

It is certified that error appears in the above-identified patent and that said Letters Patent is hereby corrected as shown below:

On the Title Page:

At line (56), Other Publications, please insert -- Illustration of Samson 241 valve plug. --.

At line (56), Other Publications, please insert -- International Search Report for PCT/US03/21165, issued November 13, 2003. --.

In the Specification:

At Column 5, line 33, please delete "procedures" and insert -- procedure --.

Signed and Sealed this

Fourteenth Day of August, 2007

JON W. DUDAS
*Director of the United States Patent and Trademark Office*